United States Patent
Ahn et al.

(10) Patent No.: US 8,767,528 B2
(45) Date of Patent: Jul. 1, 2014

(54) METHOD AND APPARATUS FOR RECEIVING RECEPTION ACKNOWLEDGEMENT IN WIRELESS COMMUNICATION SYSTEM

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 13/387,082

(22) PCT Filed: Jul. 26, 2010

(86) PCT No.: PCT/KR2010/004890
§ 371 (c)(1),
(2), (4) Date: Jan. 25, 2012

(87) PCT Pub. No.: WO2011/013968
PCT Pub. Date: Feb. 3, 2011

(65) Prior Publication Data
US 2012/0120908 A1    May 17, 2012

Related U.S. Application Data

(60) Provisional application No. 61/228,605, filed on Jul. 26, 2009.

(30) Foreign Application Priority Data

Jul. 26, 2010  (KR) .......................... 10-2010-0071828

(51) Int. Cl.
*H04W 72/04*   (2009.01)
(52) U.S. Cl.
USPC .......................................... 370/216; 370/252
(58) Field of Classification Search
USPC .......... 370/216, 252, 328, 329; 714/748, 749; 455/450, 509
See application file for complete search history.

(56) References Cited

U.S. PATENT DOCUMENTS

2008/0293424 A1\*  11/2008  Cho et al. ...................... 455/450
2008/0310483 A1   12/2008  Lee et al.
(Continued)

FOREIGN PATENT DOCUMENTS

GB        2460958 A      12/2009
KR    10-0893869 B1       4/2009
(Continued)

OTHER PUBLICATIONS

ETSI TS 136 211 V8.7.0 (Jun. 2009) LTE; Evolved Universal Terrestrial Radio Access (E-UTRA); Physical channels and modulation (3GPP TS 36.211 version 8.7.0 Release 8), www.etsi.org/deliver/etsi_ts/136200_136299/136211/08.07.00_60/ts_136211v080700p.pdf, Section 6.\*

(Continued)

*Primary Examiner* — Andrew Chriss
*Assistant Examiner* — Jose Perez
(74) *Attorney, Agent, or Firm* — Birch, Stewart, Kolasch & Birch, LLP

(57) ABSTRACT

The present invention provides a method and an apparatus for receiving reception acknowledgement for HARQ (Hybrid Automatic Repeat Request) in a wireless communication system. A terminal receives, from a base station, an uplink resource allocation that includes information on a plurality of allocated RBs (Resource Blocks) within a subframe that includes the plurality of RBs, and transmits uplink transmission blocks to a PUSCH (Physical Uplink Shared Channel) by using the plurality of allocated RBs on the subframe. The terminal receives, from the base station, ACk/NACK signals on a PHICH (Physical Hybrid-ARQ Indicator Channel). PHICH resources used on the PHICH are identified by the lowest index among indexes of the plurality of allocated RBs, and at least two of the indexes of the plurality of RBs are linked by being overlapped with the same PHICH resource.

12 Claims, 12 Drawing Sheets

(56) References Cited

U.S. PATENT DOCUMENTS

| | | | |
|---|---|---|---|
| 2009/0097447 A1* | 4/2009 | Han et al. | 370/330 |
| 2009/0175233 A1* | 7/2009 | Ojala et al. | 370/329 |
| 2009/0201863 A1* | 8/2009 | Pi | 370/329 |
| 2009/0241004 A1 | 9/2009 | Ahn et al. | |
| 2010/0195583 A1* | 8/2010 | Nory et al. | 370/329 |
| 2010/0322324 A1* | 12/2010 | Lindh et al. | 375/259 |
| 2011/0007695 A1* | 1/2011 | Choi et al. | 370/329 |

FOREIGN PATENT DOCUMENTS

| | | |
|---|---|---|
| KR | 10-0900289 B1 | 5/2009 |
| KR | 10-0905385 B1 | 6/2009 |
| WO | 2008/105273 A1 | 9/2008 |
| WO | WO 2010149221 A1 * | 12/2010 |

OTHER PUBLICATIONS

Nokia et al., "PHICH and Mapping to PHICH Groups," 3GPP TSG RAN WG1 Meeting #51bis, Agenda Item 6.1.3 Downlink Control Signaling, R1-080301, Jan. 14-18, 2008, Sevilla, Spain, 5 pages.

Nokia et al., "PHICH in LTE-Advanced," 3GPP TSG-RAN WG1 Meeting #57, Agenda Item 15.4, R1-091769, May 4-8, 2009, San Francisco, California, USA, 3 pages.

Samsung, "PHICH Mapping in Asymmetric Carrier Aggregation," 3GPP TSG RAN WG1 Meeting #7, Agenda Item 15.4, R1-091873, May 4-9, 2009 San Francisco, California, USA, 3 pages.

Samsung, "PHICH Transmission in LTE-A," 3GPP TSG RAN WG1 #56, Agenda Item 12.1, R1-090610, Feb. 9-13, 2009, Athens, Greece, 3 pages.

* cited by examiner

METHOD AND APPARATUS FOR RECEIVING RECEPTION ACKNOWLEDGEMENT IN WIRELESS COMMUNICATION SYSTEM

CROSS REFERENCE TO RELATED APPLICATIONS

This application is the National Phase of PCT/KR2010/004890 filed on Jul. 26, 2010, which claims the benefit under 35 U.S.C. 119(e) of U.S. Provisional Application No. 61/228,605 filed on Jul. 26, 2009, and claims priority under 35 U.S.C. 119 (a) to Patent Application No. 10-2010-0071828 filed in Republic of Korea on Jul. 26, 2010, all of which are hereby expressly incorporated by reference into the present application.

TECHNICAL FIELD

The present invention relates to wireless communications, and more particularly, to a method and apparatus for receiving a reception acknowledgement for hybrid automatic repeat request (HARQ) in a wireless communication system, and a method and apparatus for transmitting the reception acknowledgment.

BACKGROUND ART $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

In a hybrid automatic repeat request (HARQ) scheme, whether data received by a physical layer has an unrecoverable error is determined and retransmission is requested upon detecting the error, thereby improving performance.

If no error is detected from the received data, a receiver transmits a positive-acknowledgement (ACK) signal as a reception acknowledgment so that a transmitter is informed that the data is successfully received. Otherwise, if an error is detected from the received data, the receiver transmits a negative-acknowledgement (NACK) signal as a reception acknowledgment so that the transmitter is informed that the error is detected. When the NACK signal is received, the transmitter can retransmit data.

In recent years, there is an ongoing discussion on 3GPP LTE-advanced (LTE-A) evolved from the 3GPP LTE. The 3GPP LTE-A ensures backward compatibility with the 3GPP LTE, and supports a wideband by using carrier aggregation.

The 3GPP LTE-A has a basic frequency band supporting compatibility with the 3GPP LTE and an extended frequency band not supporting compatibility with the 3GPP LTE.

A physical channel used in the 3GPP LTE does not consider an extended frequency band supported by the 3GPP LTE-A. Therefore, a reception acknowledgment for HARQ may not be transmitted through the physical channel when data is transmitted in the extended frequency band.

SUMMARY OF INVENTION

Technical Problem

The present invention provides a method and apparatus for receiving a reception acknowledgement for hybrid automatic repeat request (HARQ) in a wireless communication system.

The present invention also provides a method and apparatus for transmitting a reception acknowledgement for HARQ in a wireless communication system.

Technical Solution

In an aspect, a method of receiving a reception acknowledgment for hybrid automatic repeat request (HARQ) in a wireless communication system is provided. The method includes receiving, by a user equipment, from a base station, an uplink resource allocation including information regarding a plurality of allocated resource blocks (RBs) in a subframe including a plurality of RBs, transmitting, by the user equipment, an uplink transport block through a physical uplink shared channel (PUSCH) by using the plurality of allocated RBs in the subframe, and receiving, by the user equipment, a positive-acknowledgement (ACK)/negative-acknowledgement (NACK) signal through a physical hybrid-ARQ indicator channel (PHICH) from the base station. A PHICH resource used for the PHICH is identified by a lowest index among indices of the plurality of allocated RBs, and at least two of the indexes of the plurality of RBs of the subframe are linked to the same PHICH in an overlapping manner.

A lowest index among indices of the plurality of RBs of the subframe may be linked to the same PITCH resource by being overlapped with another index.

A highest index among indices of the plurality of RBs of the subframe may be linked to the same PHICH resource by being overlapped with another index.

The plurality of RBs of the subframe may be allocated by being grouped in a resource block group (RBG) unit.

The uplink resource allocation may indicate allocated RBGs.

A lowest index among indices of a plurality of RBs included in each RBG may not be linked to an overlapping PHICH resource.

In another aspect, a user equipment includes a radio frequency (RF) unit for transmitting and receiving a radio signal and a processor, operatively coupled to the RF unit, for receiving a reception acknowledgment for hybrid automatic repeat request (HARQ) and configured to receive, from a base station, an uplink resource allocation including information regarding a plurality of allocated resource blocks (RBs) in a subframe including a plurality of RBs, transmit an uplink transport block through a physical uplink shared channel (PUSCH) by using the plurality of allocated RBs in the subframe and receive a positive-acknowledgment (ACK)/negative-acknowledgement (NACK) signal through a physical hybrid-ARQ indicator channel (PHICH) from the base station. A PHICH resource used for the PHICH is identified by a lowest index among indices of the plurality of allocated RBs, and at least two of the indexes of the plurality of RBs of the subframe are linked to the same PHICH in an overlapping manner.

In still another aspect, a method of transmitting a reception acknowledgment for hybrid automatic repeat request (HARQ) in a wireless communication system is provided. The method includes transmitting, by a base station, to a user equipment, an uplink resource allocation including information regarding a plurality of allocated resource blocks (RBs) in a subframe including a plurality of RBs, receiving, by the base station, an uplink transport block through a physical uplink shared channel (PUSCH) by using the plurality of allocated RBs in the subframe from the user equipment, and transmitting, by the base station, a positive-acknowledgment (ACK)/negative-acknowledgement (NACK) signal through a physical hybrid-ARQ indicator channel (PHICH) to the user equipment. A PHICH resource used for the PHICH is identified by a lowest index among indices of the plurality of allocated RBs, and at least two of the indexes of the plurality of RBs of the subframe are linked to the same PHICH in an overlapping manner.

Advantageous Effects

A physical hybrid-ARQ indicator channel (PHICH) resource for a positive-acknowledgment (ACK)/negative-acknowledgment (NACK) signal can be ensured when a basic frequency band supporting compatibility with a legacy user equipment and an additional frequency band not supporting compatibility are present.

FIG. shows uplink synchronous hybrid automatic repeat request (HARQ) in 3GPP LTE.

Figure 3:
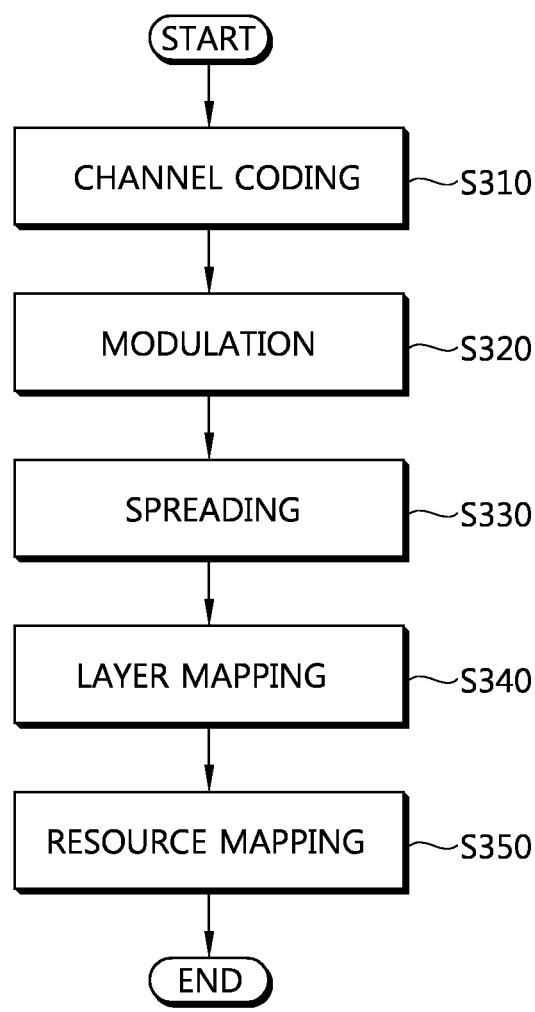

FIG. 3 shows a physical hybrid-ARQ indicator channel (PHICH) structure in 3GPP LTE.

Figure 4:
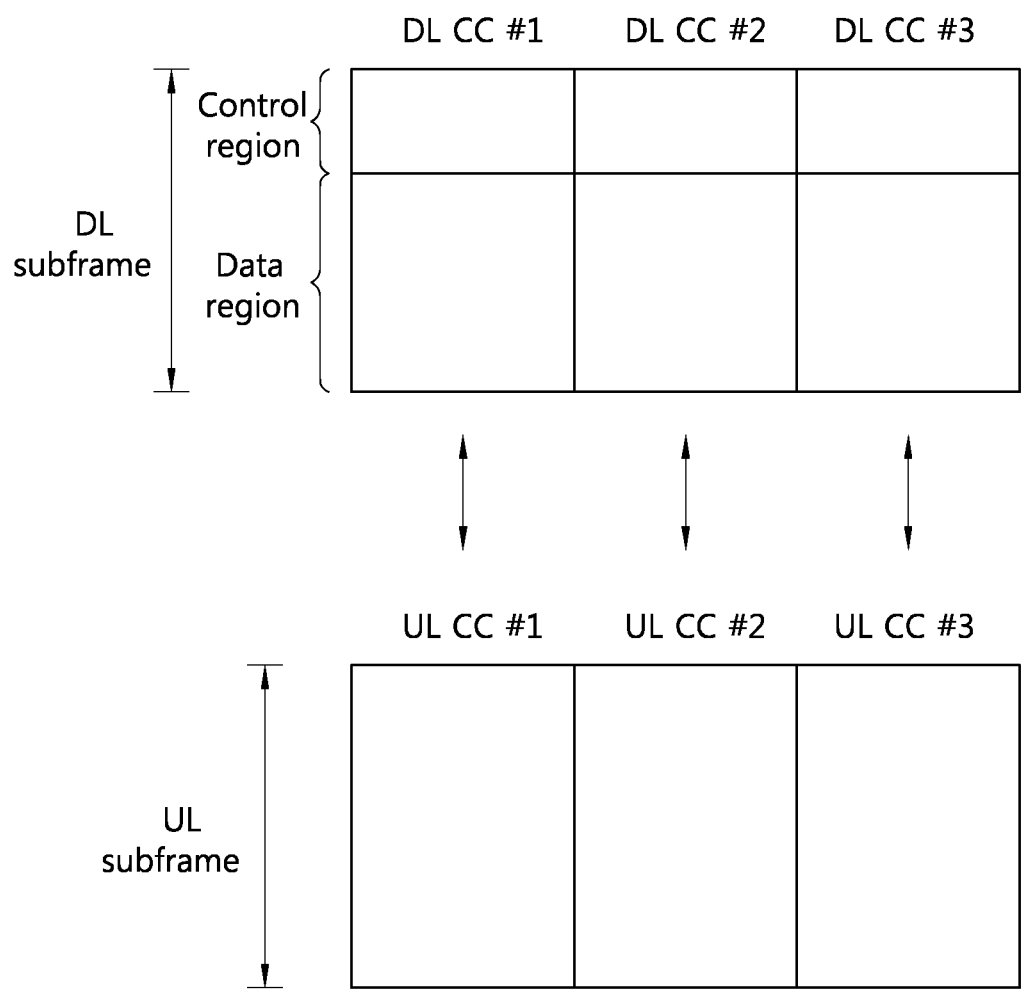

FIG. 4 shows an example of multiple carriers.

Figure 5:
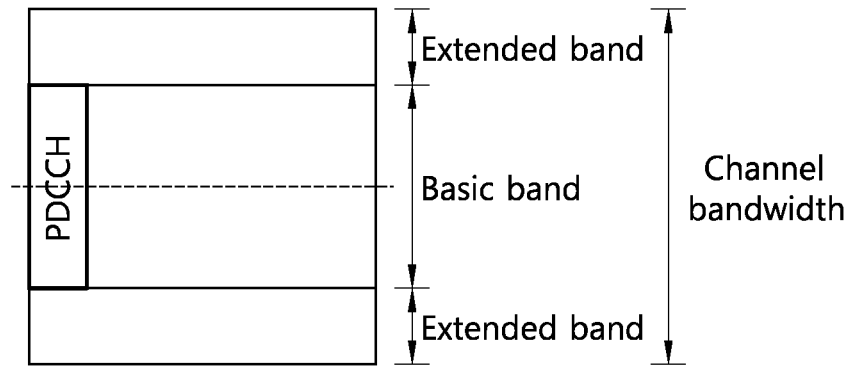

FIG. 5 shows an example of frequency resource expansion.

Figure 6:
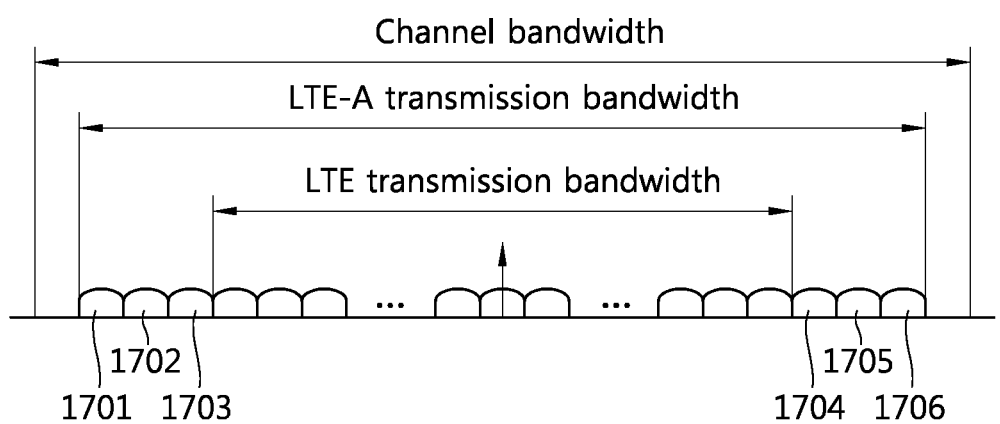

FIG. 6 shows another example of frequency resource expansion.

Figure 7:
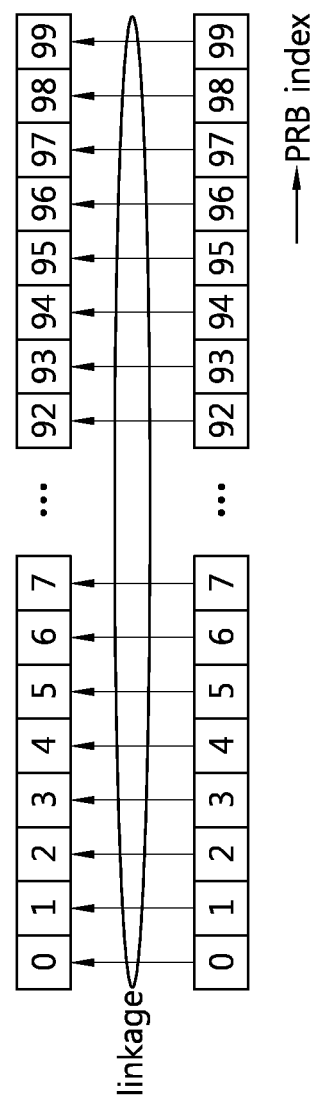

FIG. 7 shows mapping between a physical resource block (PRB) index and a physical hybrid-ARQ indicator channel (PHICH) resource according to the conventional technique.

Figure 8:
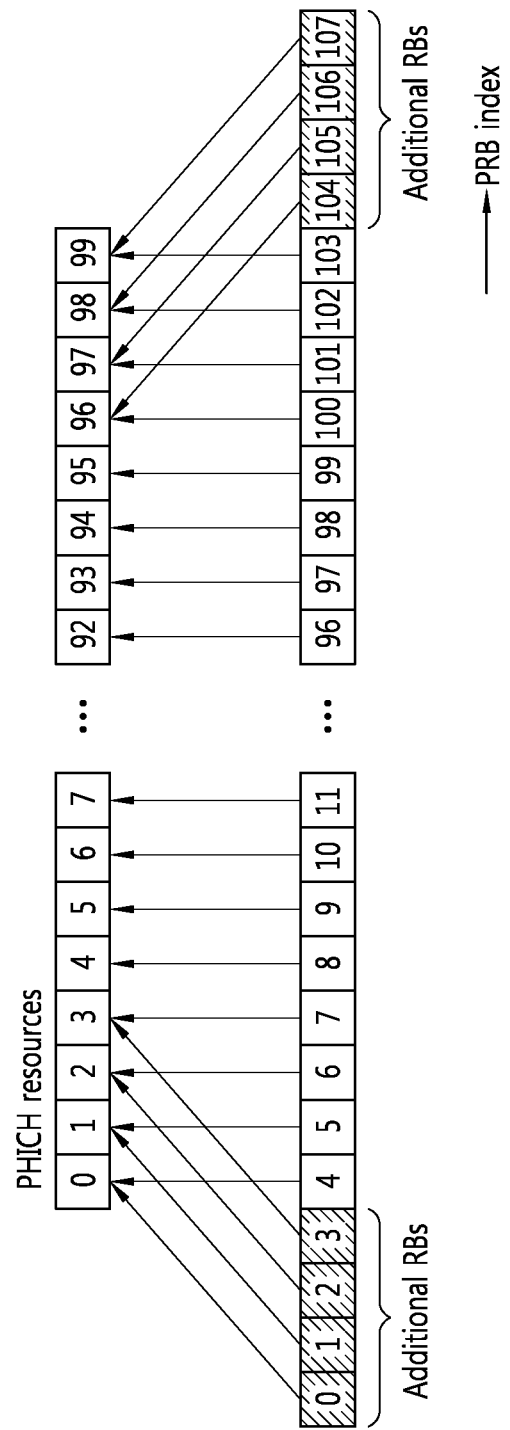

FIG. 8 shows PHICH resource allocation according to an embodiment of the present invention.

Figure 9:
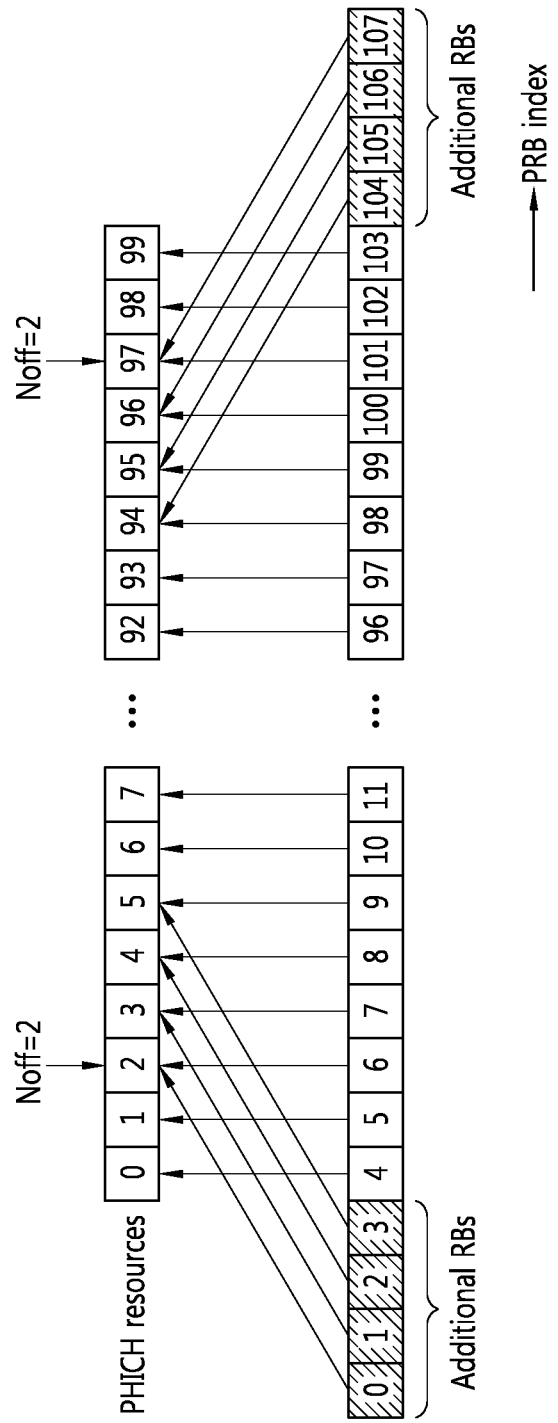

FIG. 9 shows PHICH resource allocation according to another embodiment of the present invention.

Figure 10:
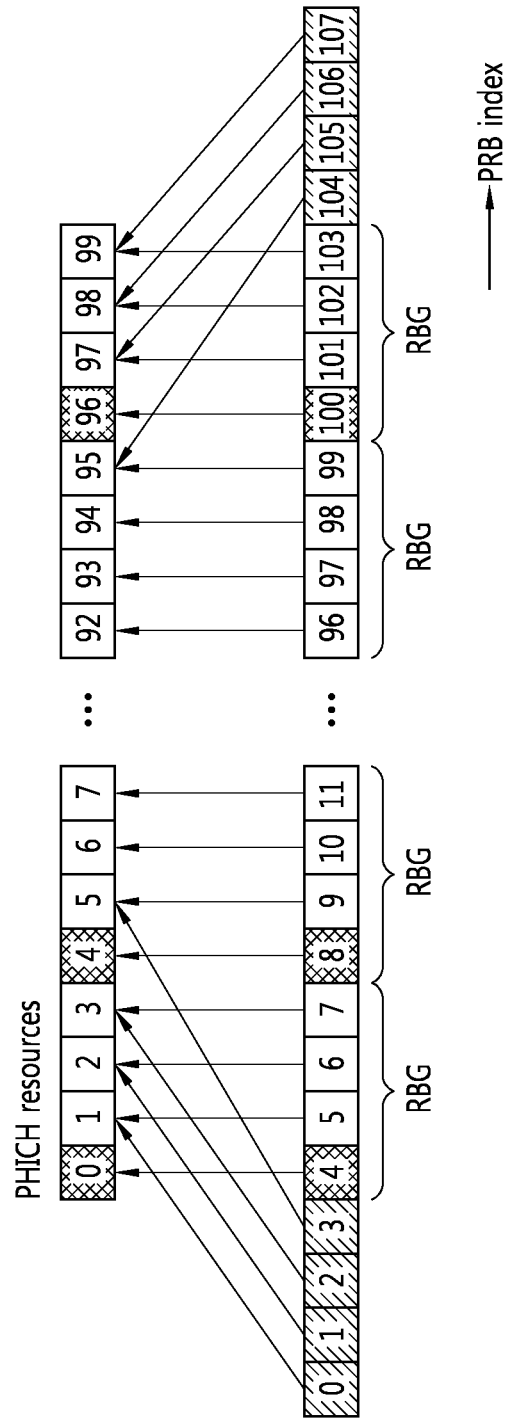

FIG. 10 shows PHICH resource allocation according to another embodiment of the present invention.

Figure 11:
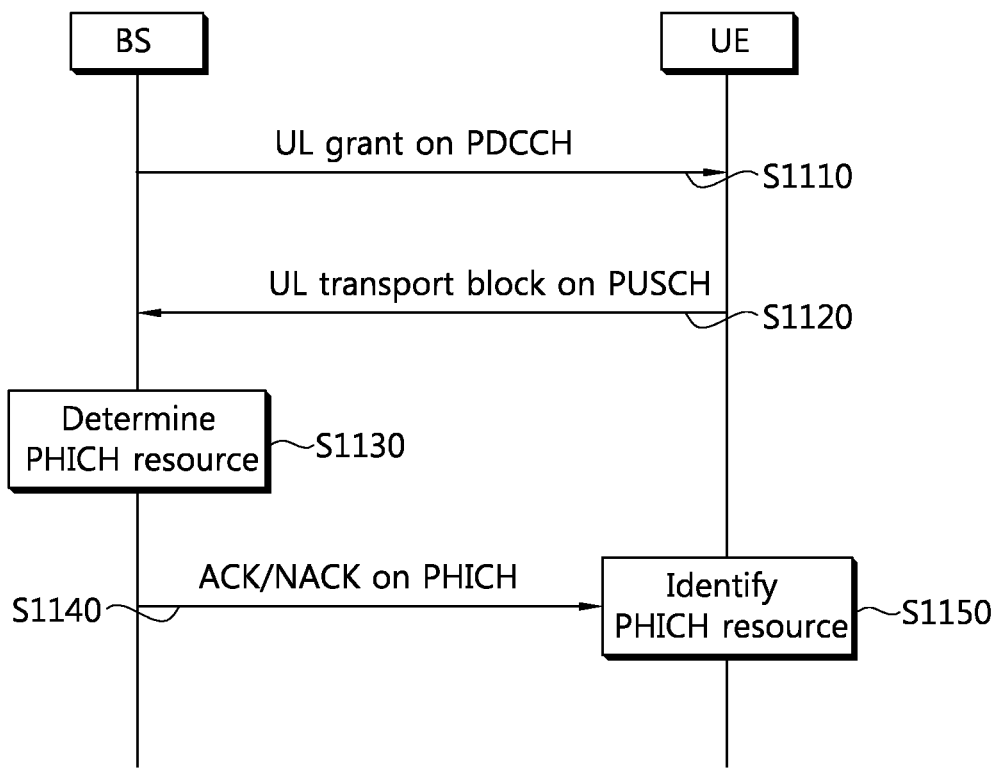

FIG. 11 is a flowchart showing a method of transmitting and receiving a reception acknowledgement according to an embodiment of the present invention.

Figure 12:
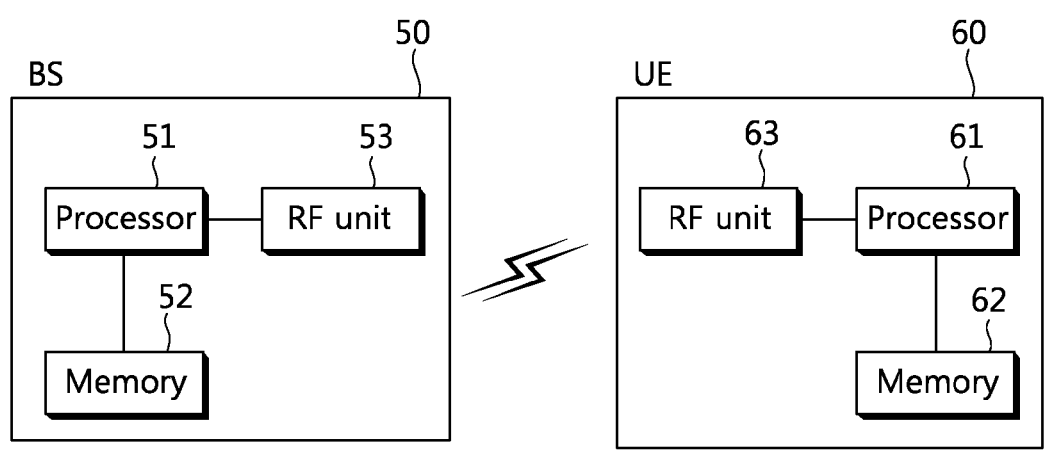

FIG. 12 is a block diagram showing a wireless communication system according to an embodiment of the present invention.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 1:
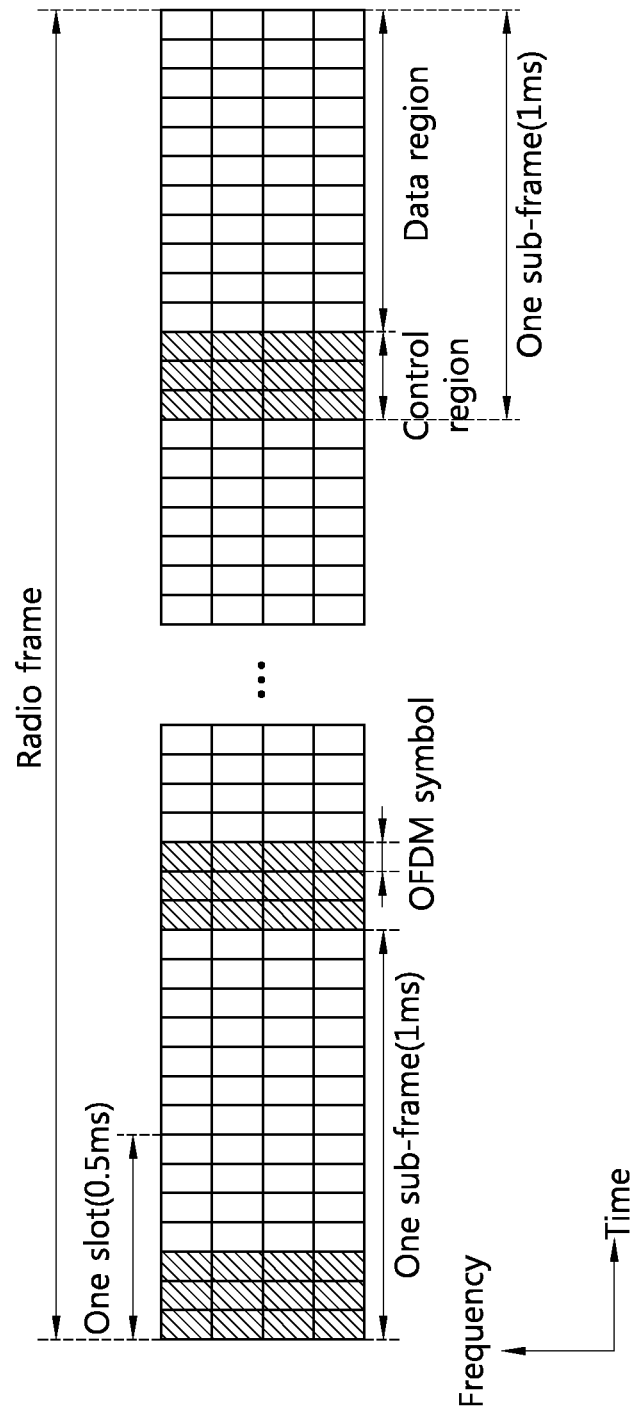
FIG. 1 shows a downlink radio frame structure in $3^{rd}$ generation partnership project (3GPP) long term evolution (LTE).

FIG. 1 shows a DL radio frame structure in $3^{rd}$ generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.5.0 (2008-12), the LTE classifies a physical channel into a data channel a control channel. The data channel includes a physical downlink shared channel (PDSCH) and a physical uplink shared channel (PUSCH). The control channel includes a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol in the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

The PHICH carries a positive-acknowledgement (ACK)/negative-acknowledgement (NACK) signal for UL hybrid automatic repeat request (HARQ). The ACK/NACK signal for UL data transmitted by the UE is transmitted through the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe, The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having the DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

In order to receive DL data, the UE first receives a DL resource allocation on the PDCCH. When PDCCH detection is successful, the UE reads the DCI on the PDCCH. By using the DL resource allocation in the DCI, DL data is received on the PDSCH. In addition, in order to transmit UL data, the UE first receives a UL resource allocation on the PDCCH. When PDCCH detection is successful, the UE reads the DCI on the PDCCH. By using the UL resource allocation in the DCI, UL data is transmitted on the PUSCH.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ interval.

Figure 2:
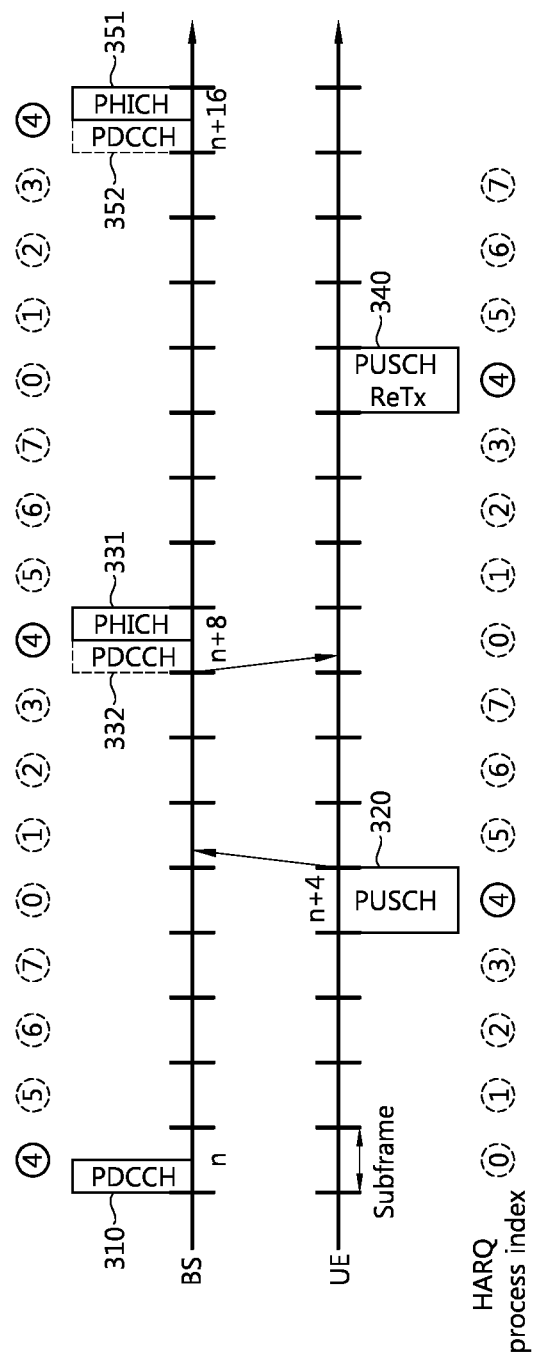

FIG. 2 shows UL synchronous HARQ in 3GPP LTE.

A UE receives an initial UL grant on a PDCCH 310 from a BS in an $n^{th}$ subframe.

The UE transmits a UL transport block on a PUSCH 320 by using the initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant.

Upon receiving the NACK signal, the UE sends a retransmission block on a PUSCH 340 in an $(n+12)^{th}$ subframe. For the transmission of the retransmission block, if the retransmission UL grant is received on the PDCCH 332, the UE uses the retransmission UL grant, and if the retransmission UL grant is not received, the UE uses the initial UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission performed in the (n+4)th subframe, retransmission is performed in the $(n+12)^{th}$ subframe, and thus synchronous HARQ is performed with an HARQ interval corresponding to 8 subframes.

Therefore, in 3GPP LTE frequency division duplex (FDD), 8 HARQ processes can be performed, and the respective HARQ processes are indexed from 0 to 7.

FIG. 3 shows a PHICH structure in 3GPP LTE. The section 6.9 of 3GPP TS 36.211 V8.5.0 (2008-12) can be incorporated herein by reference.

One PHICH carries only 1-bit ACK/NACK corresponding to a PUSCH for one UE, that is, corresponding to a single stream.

In step S310, the 1-bit ACK/NACK is coded into 3 bits by using a repetition code having a code rate of 1/3.

In step S320, the coded ACK/NACK is modulated using binary phase shift keying (BPSK) to generate 3 modulation symbols.

In step S330, the modulation symbols are spread by using an orthogonal sequence. A spreading factor (SF) is $N^{PHICH}_{SF}=4$ in a normal CP, and is $N^{PHICH}_{SF}=2$ in an extended CP. The number of orthogonal sequences used in the spreading is $N^{PHICH}_{SF}*2$ to apply I/Q multiplexing. PHICHs which are spread by using $N^{PHICH}_{SF}*2$ orthogonal sequences can be defined as one PHICH group.

Table 1 below shows an orthogonal sequence of a PHICH.

TABLE 1

| Sequence Index $n^{seq}_{PHICH}$ | Orthogonal Sequence | |
|---|---|---|
| | Normal CP($N^{PHICH}_{SF}$ = 4) | Extended CP($N^{PHICH}_{SF}$ = 2) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

In step S340, layer mapping is performed on the spread symbols.

In step S350, the layer-mapped symbols are transmitted by being mapped to resources.

A plurality of PHICHs mapped to resource elements of the same set constitute a PHICH group. Each PHICH included in the PHICH group is identified by a different orthogonal sequence. In frequency division duplex (FDD), $N^{group}_{PHICH}$, i.e., the number of PHICH groups, is constant in all subframes and can be determined by Equation 1 below.

$$N^{group}_{PHICH} = \begin{cases} \text{ceil}(N_g(N^{DL}_{RB}/8)) & \text{for normal } CP \\ 2\text{ceil}(N_g(N^{DL}_{RB}/8)) & \text{for extended } CP \end{cases}$$ [Equation 1]

Herein, Ng denotes a parameter transmitted through a physical broadcast channel (PBCH), where Ng ∈{1/6,1/2,1, 2}. $N^{DL}_{RB}$ denotes the number of DL RBs.

ceil(x) is a function for outputting a minimum value among integers equal to or greater than x. floor(x) is a function for outputting a maximum value among integers equal to or less than x.

The UE identifies a PUCCH resource used by a PHICH according to an index pair ($n^{group}_{PHICH}$, $n^{seq}_{PHICH}$). $n^{group}_{PHICH}$ denotes a PHICH group index having a value between 0 to ($N^{group}_{PHICH}-1$). $n^{seq}_{PHICH}$ denotes an orthogonal sequence index.

The index pair ($n^{group}_{PHICH}$, $n^{seq}_{PHICH}$) is obtained by Equation 2 below.

$$n^{group}_{PHICH} = (I^{lowest\_index}_{PRB\_RA} + n_{DMRS}) \bmod N^{group}_{PHICH} + I_{PHICH}N^{group}_{PHICH}$$

$$n^{seq}_{PHICH} = (\text{floor}(I^{lowest\_index}_{PRB\_RA}/N^{group}_{PHICH}) + n_{DMRS}) \bmod 2N^{PHICH}_{SF}$$ [Equation 2]

Herein, $n_{DMRS}$ denotes a cyclic shift of a demodulation reference signal (DMRS) within the most recent UL grant for a transport block related to corresponding PUSCH transmission. The DMRS is a reference signal (RS) used for PUSCH transmission. $N^{PHICH}_{SF}$ denotes an SF size of an orthogonal sequence used in PHICH modulation. $I^{lowest\_index}_{PRB\_RA}$ denotes the smallest PRB index in a 1st slot of corresponding PUSCH transmission. $I_{PHICH}$ is 0 or 1.

A physical resource block (PRB) is a unit frequency-time resource for transmitting data. One PRB consists of a plurality of contiguous REs in a frequency-time domain. Hereinafter, the RB and the PRB are used for the same concept.

Now, a multiple carrier system is described.

To support a higher data rate, a multiple carrier system supporting a plurality of component carriers (CCs) is taken into account.

Spectrum aggregation (or bandwidth aggregation, also referred to as carrier aggregation) supports a plurality of CCs. The CC is defined with a center frequency and a bandwidth. For example, when 5 CCs are allocated with a granularity of a carrier unit having a bandwidth of 20 MHz, a bandwidth of up to 100 MHz can be supported.

FIG. 4 shows an example of multiple carriers. Although there are three DL CCs and three UL CCs in the figure, the number of DL CCs and the number of UL CCs are not limited thereto. A PDCCH and a PDSCH are independently transmitted in each DL CC. A PUCCH and a PUSCH are independently transmitted in each UL CC.

A UE can concurrently monitor a plurality of DL CCs, and can receive DL data. However, even if a BS operates M DL CCs, N DL CCs can be allocated to the UE. In addition, the BS can be configured such that L DL CCs are preferentially monitored and received by the UE. Herein, L≤N≤M.

To increase resource efficiency in each CC, frequency resource expansion is taken into account. A frequency resource in the CC includes a basic frequency resource providing compatibility with the legacy 3GPP LTE and an extended frequency resource extended from the basic frequency resource. The basic frequency resource is a resource used by a legacy UE supporting 3GPP LTE, but the extended frequency resource cannot be used by the legacy UE FIG. 5 shows an example of frequency resource expansion.

A channel bandwidth of a CC includes a basic band and at least one extended band.

The basic band is a band used by a legacy UE, and is compatible with 3GPP LTE. A control channel (i.e., a PDCCH) and data channel based on 3GPP LTE are transmitted in the basic band.

The extended band is also called a segment, and is not compatible with 3GPP LTE. The extended band includes at least one RB. An RB included in the extended band is called an additional RB to distinguish it from an RB included in the basic band. When a channel bandwidth includes 30 RBs, 25 RBs are included in the basic band and the remaining additional 5 RBs are included in the extended band.

Although it is shown that the extended band is arranged to the both sides of the basic band for example, a location and size of the extended band are not limited thereto.

The extended band is an expansion of a CC, and is related to one CC. Since system information or a synchronization signal for the extended band is unnecessary, system overhead can be decreased. A control channel may not be transmitted in the extended band. The extended band cannot be used for random access or cell selection/reselection.

FIG. 6 shows another example of frequency resource expansion.

In 3GPP LTE, bandwidth utilization is 90%. In a channel bandwidth, a band other than a transmission bandwidth is used as a guard band. That is, 10% of the bandwidth is allocated to the guard band. For example, in a 20 MHz channel bandwidth, the transmission bandwidth supports 100 RBs except for the guard band.

However, it is considered to increase the bandwidth utilization to 90% or higher in LTE-A. Therefore, as shown in FIG. 6, in the same channel bandwidth, an LTE-A transmission bandwidth may be wider than an LTE transmission bandwidth. Accordingly, an additional RB can be obtained. For example, if the LTE transmission bandwidth includes 100 RBs, the LTE-A transmission bandwidth includes six additional RBs 1701, 1702, 1703, 1704, 1705, and 1706. As a result, 106 RBs are present in total.

This is similar to the frequency resource expansion of FIG. 5 when the LTE transmission bandwidth is used as a basic band and when an additional RB is considered as an extended bandwidth.

Hereinafter, an RB belonging to a basic band recognized by a legacy UE is referred to as a conventional RB, and a newly added RB is referred to as an additional RB.

FIG. 7 shows mapping between a PRB index and a PHICH resource according to the conventional technique.

A UE identifies a PHICH resource used by a PHICH according to an index pair ($n^{group}_{PHICH}$, $n^{seq}_{PHICH}$) given by Equation 2. Parameters required to determine the index pair are $n_{DMRS}$ and $I^{lowest\_index}_{PRB\_RA}$. In each PUSCH transmission, the PHICH resource can be determined based on a lowest PRB index in a 1st slot of a corresponding PUSCH.

Assume that there are 100 RBs indexed from 0 to 99. Respective RB indices are 1:1 mapped to PHICH resources. That is, a PHICH resource mapped to a lowest index among indices of RBs used in PUSCH transmission is used among a plurality of PHICH resources. A PHICH resource linked to a lowest RB index among indices of RBs used in transmission of a UL transport block may be used in transmission of an ACK/NACK signal.

Now, since an additional RB is introduced due to the aforementioned extended band, a method of defining a PHICH resource corresponding to the additional RB will be proposed.

In order to ensure compatibility with the conventional 3GPP LTE, it is assumed that the number of PHICH resources does not increase whereas the number of UL RBs increases.

For clarity of explanation, it is assumed that the number of PHICH resources is 100, the number of conventional RBs is 100, and the number of additional RBs is 8. However, the number of PHICH resources, the number of RBs, the number of additional RBs, and the number of RB indices are for exemplary purposes only, and thus the present invention is not limited thereto.

FIG. 8 shows PHICH resource allocation according to an embodiment of the present invention. RBs are indexed from 0 to 107, and four RBs located at both sides are additional RBs. Conventional RBs are 1:1 linked to PHICH resources.

The additional RBs are linked to a PHICH resource mapped to a contiguous lowest index of the conventional RB or a contiguous highest index of the conventional RB. Additional RBs (i.e., RB0, RB1, RB2, RB3) adjacent to the conventional RB having the lowest index are sequentially linked starting from a PHICH resource 0 corresponding to the lowest conventional RB index. Additional RBs (RB104, RB105, RB106, RB107) adjacent to the conventional RB having the highest index are sequentially linked in a reverse order starting from a PHICH resource 99 corresponding to the highest conventional RB index.

With the introduction of the additional RB, indices of the additional RBs in a subframe are linked to the same PHICH as an index of a conventional RB in an overlapping manner.

Since a plurality of RB indices are linked to one PHICH resource in an overlapping manner, collision may occur in the PHICH resource. For example, this is a case where a $1^{st}$ ACK/NACK signal for a $1^{st}$ UL transport block of which a lowest RB index is 1 and a $2^{nd}$ ACK/NACK signal for a $2^{nd}$ UL transport block of which a lowest RB index is 5 need to be transmitted simultaneously in a certain subframe. The $1^{st}$ and $2^{nd}$ ACK/NACK signals require the same PHICH resource 1. In this case, which RB will be prioritized between an additional RB and a conventional RB can be determined. For example, when collision occurs in the PHICH resource, a PHICH resource mapped to an additional RB is prioritized. Therefore, the $1^{st}$ ACK/NACK signal may not be transmitted when the $2^{nd}$ ACK/NACK signal is transmitted.

A BS can report to a UE about whether to apply a priority to an RB index overlapping in the same PHICH resource and/or about a specific RB index to which a priority will be given.

Equation 3 below shows the aforementioned embodiment expressed similarly to Equation 2 above.

$$n_{PHICH}^{group} = (I_{PRB} + n_{DMRS}) \bmod N_{PHICH}^{group} + I_{PHICH} \cdot N_{PHICH}^{group}$$

$$n_{PHICH}^{seq} = (\text{floor}(I_{PRB}/N_{PHICH}^{group}) + n_{DMRS}) \bmod 2N_{SF}^{PHICH}$$

[Equation 3]

Herein, if $0 \leq I^{lowest\_index}_{PRB\_RA} < N^{add}_{RB}/2$, $I_{PRB} = I^{lowest\_index}_{PRB\_RA}$. If $N^{add}_{RB}/2 \leq I^{lowest\_index}_{PRB\_RA} < (N^{UL}_{RB} - N^{add}_{RB}/2)$, $I_{PRB} = I^{lowest\_index}_{PRB\_RA} - N^{add}_{RB}/2$. If $(N^{UL}_{RB} - N^{add}_{RB}/2) \leq I^{lowest\_index}_{PRB\_RA} < N^{UL}_{RB,PRB}$, $I^{lowest\_index}_{PRB\_RA} - N^{add}_{RB}$. $I^{lowest\_index}_{PRB\_RA}$ denotes a lowest PRB index in a $1^{st}$ slot of corresponding PUSCH transmission. $N^{add}_{RB}$ denotes the number of additional RB. $N^{UL}_{RB}$ denotes the total number of UL RBs.

FIG. 9 shows PHICH resource allocation according to another embodiment of the present invention. In comparison with the embodiment of FIG. 8, an offset $N_{off}$ is applied to a start point of a PHICH resource linked to an additional RB. Although $N_{off}=2$ herein, this is for exemplary purposes only, and thus the offset value is not limited thereto.

When the offset $N_{off}$ is applied to Equation 3, it can be expressed by Equation 4 below.

$$n_{PHICH}^{group} = (I_{PRB} + N_{off} + n_{DMRS}) \bmod N_{PHICH}^{group} + I_{PHICH} N_{PHICH}^{group}$$

$$n_{PHICH}^{seq} = (\text{floor}((I_{PRB} + N_{off})/N_{PHICH}^{group}) + n_{DMRS}) \bmod 2N_{SF}^{PCICH}$$

[Equation 4]

The offset $N_{off}$ can be pre-defined between a BS and a UE. Alternatively, information on the offset $N_{off}$ can be transmitted by using an RRC message or a part of system information.

Although the same offset is used at both sides herein, it is also possible to use different offsets at both sides.

Meanwhile, 3GPP LTE-A allows discrete resource allocation by using clustered DFT-spread FDM transmission for effective resource scheduling of a UL resource unlike the conventional 3GPP LTE that allows only continuous resource allocation in UL transmission. This is to obtain flexibility of resource allocation even if a peak-to-average power ratio (PAPR) increases to some extent.

For signaling of discrete resource allocation in UL transmission, a resource block group (RBG) can be introduced. The RBG includes a plurality of contiguous RBs.

FIG. 10 shows PHICH resource allocation according to another embodiment of the present invention. It is shown herein that an additional RB is linked to a non-contiguous PHICH resource, whereas the example of FIG. 8 and FIG. 9 shows that an additional RB is linked to a contiguous PHICH resource.

Conventional RBs are grouped in an RBG unit having an RBG size of 4. A UL grant includes a resource allocation in the RBG unit. Additional RBs also can be grouped in the RBG unit.

When resources are allocated in the RBG unit, even if a plurality of RBGs are allocated, a PHICH resource is linked to an RB having a lowest index among RBs belonging to an RBG having a lowest index. For example, if a $1^{st}$ RBG including {RB0, RB1, RB2, RB3} and a $2^{nd}$ RBG including {RB4, RB5, RB6, RB7} are allocated to the UE, a PHICH resource is linked to an RB0 having a lowest index of the $1^{st}$ RBG.

Therefore, a PHICH resource linked to a $1^{St}$ RB (having a lowest index) belonging to each RBG is excluded from a PHICH resource linked to an additional RB. That is, a lowest index among indices of a plurality of RBs included in each RBG is not linked to an overlapping PHICH resource. Herein, PHICH resources 0, 4, ..., 96 are PHICH resources not linked to additional RBs.

FIG. 11 is a flowchart showing a method of transmitting and receiving a reception acknowledgement according to an embodiment of the present invention.

A BS transmits a UL grant to a UE through a PDCCH (step S1110). The UL grant includes nDMRS and a UL resource allocation regarding an allocated RB.

The UE transmits a UL transport block to the BS through a PUSCH by using the allocated RB (step S1120).

The BS determines a PHICH resource for transmitting an ACK/NACK signal in response to the received UL transport block (step S1130).

The BS transmits the ACK/NACK signal through a PHICH (step S1140). The UE identifies the PHICH resource (step S1150), and decodes the ACK/NACK signal transmitted by using the corresponding PHICH resource.

Determining of the PHICH resource and identifying of the PHICH resource can be performed according to the aforementioned embodiments of FIG. 8 to FIG. 10. One of the methods of the embodiments of FIG. 8 to FIG. 10 can be used, or at least one of the methods of the embodiments of FIG. 8 to FIG. 10 can be selectively used. Information on the method of identifying the PHICH resource can be reported by the BS to the UE by using system information, RRC messages, or L1/L2 signaling.

FIG. 12 is a block diagram showing a wireless communication system according to an embodiment of the present invention.

A BS 50 includes a processor 51, a memory 52, and a radio frequency (RF) unit 53.

The processor 51 implements the proposed functions, procedures, and/or methods. An operation of the BS can be implemented by the processor 51 in the aforementioned embodiments of FIG. 8 to FIG. 11. The processor 51 transmits a UL grant, determines a PHICH resource, and sends a reception acknowledgment through a PHICH.

The memory 52 coupled to the processor 51 stores parameters or protocols for the operation. The RF unit 53 coupled to the processor 51 transmits and/or receives a radio signal.

A UE 60 includes a processor 61, a memory 62, and an RF unit 63.

The processor 61 implements the proposed functions, procedures, and/or methods. An operation of the UE can be implemented by the processor 61 in the aforementioned embodiments of FIG. 8 to FIG. 11. The processor 61 transmits a UL grant, transmits a UL transport block through a PUSCH, and identifies a PHICH resource.

The memory 62 coupled to the processor 61 stores parameters or protocols for the operation. The RF unit 63 coupled to the processor 61 transmits and/or receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be placed inside or outside the processor and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method of receiving a reception acknowledgment for hybrid automatic repeat request (HARQ) in a wireless communication system, the method comprising:
    receiving, by a user equipment, from a base station, an uplink resource allocation including information regarding a plurality of allocated resource blocks (RBs) in an uplink subframe;
    transmitting, by the user equipment, an uplink transport block through a physical uplink shared channel (PUSCH) by using the plurality of the allocated RBs in the uplink subframe; and
    receiving, by the user equipment, a positive-acknowledgment (ACK)/negative-acknowledgement (NACK) signal through a physical hybrid-ARQ indicator channel (PHICH) from the base station,
    wherein a downlink resource used for the PHICH is identified by a lowest index among indices of the plurality of the allocated RBs in the uplink subframe, and
    wherein when the plurality of the allocated RBs in the uplink subframe include basic RBs and additional RBs extending a bandwidth, indices of the additional RBs are overlapped with indices of some basic RBs to link the additional RBs to the same downlink resource used for the PHICH.

2. The method of claim 1, wherein a lowest index among the indices of the plurality of RBs of the uplink subframe is linked to the same downlink resource used for the PHICH by being overlapped with another index.

3. The method of claim 1, wherein a highest index among the indices of the plurality of RBs of the uplink subframe is linked to the same downlink resource used for the PHICH by being overlapped with another index.

4. The method of claim 1, wherein contiguous lowest indices among the indices of the plurality of RBs of the uplink subframe are linked to the same downlink resource used for the PHICH by being overlapped with other indices.

5. The method of claim 1, wherein contiguous highest indices among the indices of the plurality of RBs of the uplink subframe are linked to the same downlink resource used for the PHICH by being overlapped with other indices.

6. The method of claim 1, wherein the plurality of RBs of the uplink subframe are allocated by being grouped in a resource block group (RBG) unit.

7. The method of claim 6, wherein the uplink resource allocation indicates allocated RBGs.

8. The method of claim 6, wherein a lowest index among the indices of a plurality of RBs included in each RBG is not linked to an overlapping PHICH resource.

9. A user equipment comprising:
    a radio frequency (RF) unit for transmitting and receiving a radio signal; and
    a processor, operatively coupled to the RF unit, for receiving a reception acknowledgment for hybrid automatic repeat request (HARQ) and configured to:
    receive, from a base station, an uplink resource allocation including information regarding a plurality of allocated resource blocks (RBs) in an uplink subframe;
    transmit an uplink transport block through a physical uplink shared channel (PUSCH) by using the plurality of the allocated RBs in the uplink subframe; and
    receive a positive-acknowledgment (ACK)/negative-acknowledgement (NACK) signal through a physical hybrid-ARQ indicator channel (PHICH) from the base station,
    wherein a downlink resource used for the PHICH is identified by a lowest index among indices of the plurality of the allocated RBs in the uplink subframe, and
    wherein when the plurality of the allocated RBs in the uplink subframe include basic RBs and additional RBs extending a bandwidth, indices of the additional RBs are overlapped with indices of some basic RBs to link the additional RBs to the same downlink resource used for the PHICH.

10. The user equipment of claim 9, wherein a lowest index among the indices of the plurality of RBs of the uplink subframe is linked to the same downlink resource used for the PHICH by being overlapped with another index.

11. The user equipment of claim 9, wherein a highest index among the indices of the plurality of RBs of the uplink subframe is linked to the same downlink resource used for the PHICH by being overlapped with another index.

12. A method of transmitting a reception acknowledgment for hybrid automatic repeat request (HARQ) in a wireless communication system, the method comprising:
    transmitting, by a base station, to a user equipment, an uplink resource allocation including information regarding a plurality of allocated resource blocks (RBs) in an uplink subframe;
    receiving, by the base station, an uplink transport block through a physical uplink shared channel (PUSCH) by using the plurality of the allocated RBs in the uplink subframe from the user equipment; and
    transmitting, by the base station, a positive-acknowledgment (ACK)/negative-acknowledgement (NACK) signal through a physical hybrid-ARQ indicator channel (PHICH) to the user equipment,
    wherein a downlink resource used for the PHICH is identified by a lowest index among the indices of the plurality of the allocated RBs in the uplink subframe, and
    wherein when the plurality of the allocated RBs in the uplink subframe include basic RBs and additional RBs extending a bandwidth, indices of the additional RBs are overlapped with indices of some basic RBs to link the additional RBs to the same downlink resource used for the PHICH.

* * * * *